Patented May 9, 1950

2,507,408

UNITED STATES PATENT OFFICE 2,507,408

1-ALKYLSULFONYL-4-ALKYL PIPERAZINES

Robert Michel Jacob, Ablon-sur-Seine, France, assignor to Societe des Usines Chimiques Rhone-Poulenc, Paris, France, a corporation of France No Drawing. Application January 4, 1949, Serial No. 69,241. In France March 5, 1948

5 Claims. (Cl. 260—268)

The present invention has for its object to provide new therapeutically interesting derivatives of piperazine of the general formula:

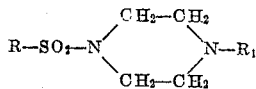

wherein R represents a member of the class consisting of alkyl radicals containing from 1 to 4 carbon atoms and phenyl radicals which may be substituted by a member of the class consisting of lower alkyls, amino, methoxy and ethoxy groups, and halogen atoms, and $R_1$ represents an alkyl radical containing not more than 3 carbon atoms. By the expression "lower alkyl" is meant a group selected from the class consisting of methyl, ethyl and propyl groups.

According to a feature of the present invention these new compounds are to be obtained by the following methods:

(i) Condensation of a sulphonyl halide of the type $R$—$SO_2X$ (where X represents a halogen atom), with an N-mono-substituted piperazine.

(ii) Cyclisation of a halogenated derivative

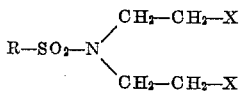

(X being a halogen atom), by condensation with a secondary amine $NH(R_1)_2$ and conversion of the quaternary derivative obtained into the corresponding substituted piperazine by known methods.

(iii) Cyclisation of a halogenated derivative

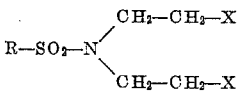

(X being a halogen atom) by condensation with a primary amine $R_1$—$NH_2$.

The derivatives

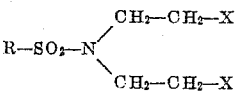

can be prepared either by condensation of sulphonyl halides of the type $R$—$SO_2$—X with the secondary halogenated amines:

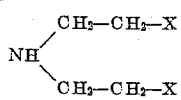

or from the corresponding hydroxy compounds:

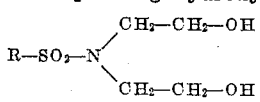

by replacing the hydroxyl groups by halogen in manner known per se (for example by the action of thionyl chloride). The hydroxy-substituted sulphonamides can themselves be obtained by the action of the sulphonyl halides $R$—$SO_2$—X on di-ethanolamine:

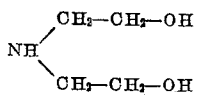

(iv) Action of an alkylating agent, such as a methyl or ethyl halide or the corresponding sulphonate on the sulphonylpiperazine:

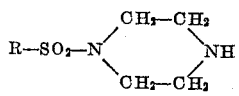

The products of the invention possess interesting physiological properties; in particular, they have been found very effective in treating conditions of traumatic and haemorrhagic shock. 1-ethanesulphonyl-4-ethyl piperazine constitutes one of the preferred products of the invention by reason of its outstanding activity in this respect.

The following non-limitative examples show how the invention can be carried into effect. The melting points referred to (unless otherwise stated) were determined by the capillary method.

Example 1

To a well agitated, cooled solution of 16 g. of N-ethylpiperazine in 100 cc. of ether, a solution of 9 g. of ethanesulphonyl chloride in 50 cc. of ether is gradually added in such a manner that the temperature does not exceed 15° C. The mixture is agitated for 2 hours at room temperature. The product is then centrifuged to remove the N-ethylpiperazine hydrochloride formed during the reaction and the residue is then washed with anhydrous ether. The ethereal solutions are collected and the ether is evaporated. There remains a yellow oil, which is distilled. In this way, 13 g. of 1-ethanesulphonyl-4-ethyl piperazine boiling at 126–127° C. under 0.7 mm. of mercury are obtained. The hydrochloride of this product melts at 178–178.5° C. The ethiodide melts at 202° C. (instantaneous melting point on the Maquenne block).

Example 2

Following the method of Example 1, but employing 8 g. of methanesulphonyl chloride, 10 g. of 1-methanesulphonyl-4-ethyl piperazine having a melting point of 80° C. are obtained after recrystallisation from ether.

Example 3

To a well agitated, cooled solution of 20 g. of N-methyl-piperazine in 100 cc. of ether, a solution of 12.85 g. of ethanesulphonyl chloride in 100 cc. of ether is gradually added in such a manner that the temperature does not exceed 15° C. After being allowed to stand for one hour at room temperature the mixture is taken up in an excess of dilute sulphuric acid. The mixture is then centrifuged and the solution obtained allowed to stand whereupon the aqueous acid layer which separates is decanted, rendered alkaline with caustic soda and salted with a saturated solution of potassium carbonate. The base which separates out is extracted with ether and the ethereal solutions are dried over sodium sulphate. Upon evaporation of the ether, 16 g. of 1-ethanesulphony-4-methyl piperazine are obtained which, when distilled (boiling point under 0.9 mm. of mercury=120° C.), solidifies in the form of white crystals having a melting point of 34–35° C.

*Example 4*

Following the procedure of Example 1, but replacing the N-ethyl piperazine by 12.5 g. of N-isopropylpiperazine with 6.3 g. of ethanesulphonyl chloride, 7.6 g. of 1-ethanesulphonyl-4-isopropyl piperazine boiling at 129–130° C. under 0.7 mm. of mercury are obtained, the hydrochloride of this product melting at 212–213° C. (instantaneous melting point on the Maquenne block).

*Example 5*

By following the procedure of Example 1, but replacing the ethanesulphonyl chloride by 13.1 g. of n-propanesulphonyl bromide, 13.3 g. of 1-propanesulphonyl-4-ethyl piperazine are obtained in the form of a colourless liquid boiling at 140–142° C. under 0.9 mm. of mercury, the hydrochloride of which product melts at 182.5–183° C.

*Example 6*

By following the procedure of Example 1, but replacing the N-ethylpiperazine by 13.8 g. of N-isopropyl piperazine and replacing the ethanesulphonyl chloride by 10.1 g. of isopropanesulphonyl bromide, there are obtained 10 g. of 1-isopropanesulphonyl-4-isopropyl piperazine, which boils at 130° C. under 0.6 mm. of mercury and melts at 48.5° C. The hydrochloride melts at about 245–250° C. (instantaneous melting point on the Maquenne block).

*Example 7*

By following the procedure of Example 1, but replacing the ethanesulphonyl chloride by 14 g. of n-butanesulphonyl bromide, there are obtained 12.8 g. of 1-n-butanesulphonyl-4-ethyl piperazine in the form of a colourless oil which boils at 131.5–132° C. under 0.45 mm. of mercury and the hydrochloride of which melts at 185–186° C.

*Example 8*

A mixture of 14 g. of N:N-di(β-chloroethyl)-benzene sulphonamide having a melting point of 47–48° C. (obtained by the action of benzenesulphonyl chloride on the hydrochloride of N:N-di(β-chloroethyl)-amine in acetone in the presence of sodium carbonate), 6.75 g. of dimethylamine and 10 cc. of absolute alcohol, is heated in a sealed tube for 3 hours at 130° C. The alcohol is evaporated to leave a solid residue which is taken up in a little water. The product is then filtered to produce 13.8 g. of a moist crude product which is purified by recrystallisation from alcohol and which is 1-benzenesulphonyl-4-methyl piperazine having a melting point of 129–130° C.

*Example 9*

A mixture of 20 g. of N-benzenesulphonyl piperazine having a melting point of 108–109° C. (obtained by hydrolysis of 1-benzenesulphonyl-4-carbethoxy piperazine having a melting point of 115–116° C., which is itself prepared by the action of benzenesulphonyl chloride on the known N-carbethoxypiperazine), 20 g. of methyl benzene sulphonate, 7 g. of anhydrous sodium carbonate and 100 cc. of absolute alcohol is heated under reflux until evolution of carbon dioxide has ceased. The mixture is filtered hot and the alcohol is evaporated to leave a solid residue which is purified by dissolution in a dilute acid, precipitation by addition of ammonia and recrystallisation from alcohol. There are obtained 5.2 g. of 1-benzenesulphonyl-4-methyl piperazine having a melting point of 129–130° C., which is identical to the product of Example 8.

*Example 10*

A mixture of 13.2 g. of N:N-di-(β-chloroethyl)-benzene-sulphonamide, 4.35 g. of monomethylamine and 34 cc. of absolute alcohol is heated in a sealed tube for 5 hours at 130° C. The alcohol is driven off on a water bath, and the residue is taken up in 50 cc. of water and 10 cc. of caustic soda solution (36° Bé.); after filtering and washing with water, 10.8 g. of 1-benzenesulphonyl-4-methyl piperazine identical to the product described in Example 8 are obtained.

*Example 11*

A mixture of 20 g. of N-bis-(β-chloroethyl)-benzene sulphonamide, 10 g. of anhydrous monoethylamine and 24 cc. of absolute alcohol is heated in a sealed tube for 7 hours at 130–135° C. When the reaction is complete, the alcohol is evaporated on the water bath and the residue is taken up in 15 cc. of ice water and filtered. The product is recrystallised from aqueous (66%) alcohol. In this way, 15.3 g. of 1-benzenesulphonyl-4-ethyl piperazine having a melting point of 127° C. are obtained.

*Example 12*

If, in the process of Example 11, the ethylamine is replaced by propylamine (20 g.) there are obtained 15.4 g. of 1-benzenesulphonyl-4-propyl piperazine, which melts at 131–132° C.

*Example 13*

By following the procedure of Example 11, but with 20 g. of isopropylamine instead of 10 g. of monoethylamine, 19 g. of 1-benzenesulphonyl-4-isopropyl piperazine are obtained. Melting point 123–123.3° C.

*Example 14*

By following the procedure of Example 11, but starting with 4 g. of N-bis-(β-chloroethyl)-p-chlorobenzene sulphonamide (instead of N-bis-(β-chloroethyl) benzene sulphonamide) and with monoethylamine in aqueous solution (8 cc.; concentration 52%) instead of anhydrous monoethylamine, 1 - (p - chlorobenzenesulphonyl)-4-ethyl piperazine melting at 78–79° C. is obtained.

*Example 15*

By following the procedure of Example 14, but with 296 g. of N-bis-(β-chloroethyl)-p-toluenesulphonamide and 350 cc. of an aqueous solution of 9.5 N monomethylamine, there are obtained 209 g. of 1-p-toluenesulphonyl-4-methyl piperazine, which melts at 152–153° C.

*Example 16*

A mixture of 20 g. of N:N-di-(β-chloroethyl)-p-toluenesulphonamide (obtained as described in French patent specification No. 906,094), 14 g. of anhydrous diethylamine and 25 cc. of absolute alcohol is heated in a sealed tube at 125° C. for 5 hours. The alcohol and the excess diethylamine are distilled under reduced pressure. The residue is taken up in a little water, and an equal volume of a saturated potassium carbonate solution is added. An oily layer separates, is decanted and then distilled under reduced pressure. Water first distils, whereafter a lively reaction takes place at about 250° C. (temperature of the heating bath). 14 g. of an oil (boiling point under 1.2 mm. of mercury=196–198° C.) are recovered and this oil crystallises. By recrystallisation from dilute alcohol, pure 1-p-toluenesulphonyl-4-ethyl piperazine is obtained in the form of white crystals having a melting point of 73° C.

*Example 17*

By following the procedure of Example 1, but replacing the ethanesulphonyl chloride by 14.5 g. of p-methoxybenzene-sulphonyl chloride, there are obtained after evaporation of the ethereal solutions, 19 g. of pure 1-p-methoxy-benzenesulphonyl-4-ethyl piperazine which melts at 88–89° C. after recrystallisation from methyl alcohol (80%).

I claim:

1. New therapeutically useful compounds selected from the group consisting of derivatives of piperazine of the general formula:

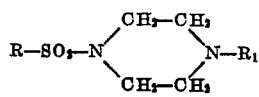

wherein R represents an alkyl radical containing from 1 to 4 carbon atoms and $R_1$ represents an alkyl radical containing not more than 3 carbon atoms, and their salts.

2. A compound selected from the class consisting of 1-ethanesulphonyl-4-ethyl piperazine and its acid salts.

3. A compound selected from the class consisting of 1-ethanesulphonyl-4-methyl piperazine and its acid salts.

4. A compound selected from the class consisting of 1-propanesulphonyl-4-ethyl piperazine and its acid salts.

5. A process for the production of new therapeutically useful piperazine derivatives which comprises condensing a sulphonyl halide of the type R—$SO_2$—X with an N—$R_1$—piperazine, R representing an alkyl radical containing from 1 to 4 carbon atoms and $R_1$ representing an alkyl radical containing not more than 3 carbon atoms and X representing a halogen atom.

ROBERT MICHEL JACOB.

OTHER REFERENCES

Kohlbach, Chemical Abstracts, 33, 2897 (1939), citing Archiv. Hem. Farm., 11, 94–123 (1937).

Kermack et al., J. Chem. Soc., 1940, 202–205.